July 23, 1968 R. H. JONES 3,394,049

NUCLEAR REACTOR CORE CONFIGURATION

Filed Sept. 28, 1967

INVENTOR
RALPH H. JONES

BY
ATTORNEY

United States Patent Office 3,394,049
Patented July 23, 1968

3,394,049
NUCLEAR REACTOR CORE CONFIGURATION
Ralph H. Jones, Gaithersburg, Md., assignor, by mesne assignments, to the United States of America as represented by the United States Atomic Energy Commission
Filed Sept. 28, 1967, Ser. No. 671,500
7 Claims. (Cl. 176—37)

ABSTRACT OF THE DISCLOSURE

Neutron reactive material elements for a nuclear reactor core which are substantially self-supporting and self-aligning and which may be replaced individually, constructed in the form of a longitudinally elongated trifid having three slab-like fins angularly displaced about and projecting from a common central axial region thus providing for assembly into an interlocking lattice structure adaptable for disposition in varied reactor core configurations.

BACKGROUND OF THE INVENTION

This invention relates to core elements for nuclear reactors and more particularly to core elements which are self-spacing and self-supporting so as to facilitate fabrication of a reactor core.

This invention arose in the course of, or under, Contact No. AT(11-1)-GEN-8 with the United States Atomic Energy Commission.

In fabricating nucler reactor cores, it is common practice to provide an assembly of elements of fissile fuel, fertile breeder material, moderator or the like which require substantial independent structural support and close tolerance construction. Cylindrical body fuel elements with multiple thin fin configurations have in the past been found effective to maximize heat removal rates but such a design implies an undesirable reduction in element diameter to increase heat transfer area. Independent support members are then necessary to maintain the structural integrity of the assembly in the presence of rapid flow rates of heat transfer medium or coolant. As a consequence of the high degree of support required throughout the assembly to minimize harmful flutter and reduce structural loads on the elements themselves, usual procedure necessarily introduces into the core structural material capable of parasitic neutron capture, and increases fabrication costs. Further, precise spacing of the individual elements implying close manufacturing tolerances is necessary to avoid neutron flux peaks and thermal hot spots. Another practice in the prior art provides a radiator-type fuel block assembly substantially lessening the need for independent structural support and somewhat lessening the stringency of dimensional tolerances allowable in manufacturing. However, such an assembly is generally integral so that individual elements cannot be readily replaced upon the failure of one member of the assembly. Additionally, although the spacing of the individual elements is predetermined, they usually can be arrayed only in a single specified core configuration. Moreover, fission product gas pressure has often in the past necessitated the utilization of a heavier cladding, thus decreasing heat transfer capabilities and increasing parasitic neutron capture.

SUMMARY OF THE INVENTION

The present invention provides an element structure of clad neutron reactive material, i.e., fissile fuel, breeder material, moderator, or the like in an elongated trifid configuration which allows for ready assembly of a plurality of like elements to form a nuclear reactor core as well as to permit convenient replaceability. When assembled in a reactor core, the trifid configuration of the element structure is self-aligning and does not require close tolerance fabrication. Moreover, while attendant construction and maintenance costs are thereby decreased, the present invention also increases the surface to volume ratio of the individual elements so as to provide greater heat transfer thus enabling the reactor to operate at higher specific power levels without increasing the central temperature of the element since the temperatures throughout the element and even along the structural axes of the elements can be made uniform. More specifically, the present element of neutron reactive material, i.e., fissile fuel, moderator, blanket material or the like, is constructed as an integrally clad elongated body having a trifurcated cross sectional configuration, a plurality of which may be assembled so as to furnish a reactor core of any of a variety of polygonal shapes. Each of said elements are provided with a female seat region between each adjacent fin, or arm, of the trifid configuration, which seat receives a corresponding peripheral fin edge of an adjacent element in mating relation and not abutting along any other outer longitudinal surfaces. Stable three point support for neighboring elements is thereby provided, resulting in an assembly highly dampened to eliminate vibration and thus a need for additional support members. Consequently, individual elements may be easily removed without displacing the remaining elements. Such a core assembly is inherently provided with coolant channels between said elements, the effective heat transfer area of which may be conveniently designed into the core by proportioning the thickness to width ratio of the fins of the trifid. For certain purposes, the elements may also be fabricated with a structural member as the central axis thereof, which member may also be channeled to serve as a fission gas collector to which the gaseous products of nuclear events occurring in the fissioning fuel can diffuse and from which the gases may be exhausted.

It is, therefore, an object of this invention to provide an integrally clad neutron reactive material element which is self-aligning when a plurality thereof are assembled as a nuclear reactor core but which does not require close tolerance construction.

It is another object of this invention to provide an integrally clad neutron reactive material element, a plurality of which may be assembled as a nuclear reactor core of any desired polygonal configuration.

It is still another object of this invention to provide a neutron reactive material element core assembly which is substantially self-supporting and whose members may be removed and replaced without disturbing the position of the remaining members.

Other and more particular objects will be manifest upon study of the following detailed description, when taken together with the accompanying drawings.

DESCRIPTION OF THE PREFERRED EMBODIMENTS

The neutrol reactive material elements of this invention are most advantageously utilized in a nuclear reactor core when assembled as a plurality in a polygonal cylinder array which intrinsically defines a plurality of longitudinal equal-spaced coolant channels within said cylinder.

In general the neutron reactive material elements of the invention have an elongated bar or rod of trifid configuration in which three rib or arm members project radially in angularly spaced position from an axial supporting columnar region. The neutron reactive material, i.e., fissile fuel, moderator, fertile material, or the like, is disposed as an elongated rectangular cross-section solid or compacted particulate form, at least, in said rib or arm portions of the elements, such form may be provided either as a rigid bar or rod or as particulate or other form rigidly supported by cladding with the region between adjacent rib portions proximate the axial region providing a seat for receiving the peripheral longitudinal edge portion of the rib of an adjacent element in a variety of modified constructions as set forth in the following description of specific embodiments and as shown in the accompanying drawing.

Figure 1:
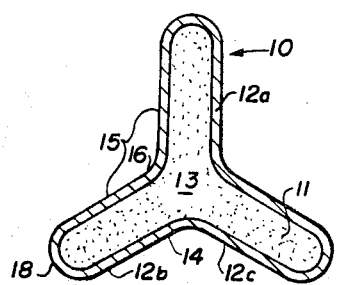
FIGURE 1 is a cross sectional view of an embodiment of the neutron reactive material element.

Referring to FIGURE 1 of the drawing, a preferred element embodiment 10 is provided as an elongated trifid pin form having three longitudinal slab-like fins or arm portions 12a, 12b, 12c of generally rectangular transverse cross section extending radially from a common axial region 13. The fins 12a, 12b, 12c are preferably fabricated to include neutron reactive material 11 such as fissile fuel, fertile breeder materials or moderator material with fins firmly joined to or integral with the axial region for which manner of construction procedures are well-known in the art. Preferably, said fins are disposed with a 120 degree angular separation therebetween and are of substantially the same width in the radial direction. In one construction the neutron reactive material which may also be included in the axial region is enclosed in an integral cladding 14 of corrosion resistant low neutron absorbant characteristics which is structurally capable of fission product containment, such as a cladding of stainless steel or a zirconium alloy sheet cladding material. The cladding 14 may be shaped and bonded to the neutron reactive material 11 metallurgically as by co-extrusion or the like, mechanically as by swaging or the like, or the bond may be provided with stagnant fluid medium of good heat transfer characteristics disposed between the neutron reactive material and the cladding, e.g., a liquid metal or the like, depending upon the type of reactor in which the element is to be utilized and the particular design criteria thereof in accord with the conventional reactor designs practice.

As required for purposes of the invention, the intersecting inner longitudinal surfaces of cladding 15 of each adjacent fin are filleted at said intersection so as to form a female seat region 16 as, for example, between fin 12a and fin 12b. The peripheral edge surface 18 of each fin is then made semi-cylindrical so as to mate with a corresponding filleted female seat region (not shown) of an adjacent element when assembled in a core array as described more fully hereinafter.

Figure 2:
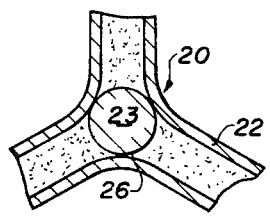
FIGURE 2 is an enlarged cross sectional view of the axial region of the element of FIGURE 1 illustrating a structural support member.

A second embodiment 20 of the neutron reactive element of the invention, illustrated in FIGURE 2, is generally similar to that of FIGURE 1; however, a cylindrical structural pin 26, is now disposed substantially co-extensive in length with the axial region 23, with the ends thereof extending beyond the cladding to be inserted in a perforated plate or baffle at the top or bottom of a core assembly to position the element in a desired array. Said pin 26 is of a diameter not greater than the transverse cross sectional width of a fin so as to preserve the general trifurcated configuration shown in FIGURE 1. While such pins provide for positioning of element ends, e.g., on a support plate in a recactor core assembly, the interlocking feature described above provides lateral support spacing for central length portions of the elements.

Figure 3:
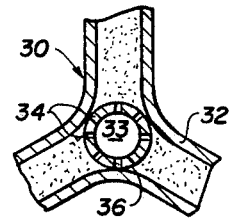
FIGURE 3 is an enlarged cross sectional view of the axial region of the element of FIGURE 1 illustrating the structural support member of FIGURE 2 channeled to provide a fission product gas collector.

A third embodiment construction 30 is illustrated in FIGURE 3 wherein a tubular member 36 replaces the pin 26 in the embodiment 20 of FIGURE 2, which tube is of an outside diameter not greater than the transverse cross sectional width of fin 32. Said tube 36 is provided with perforations or pores 34 to serve as a collector for fission product gas which diffuses from surrounding neutron reactive material. In some cases the structural member 36 may be utilized as a vent tube for gaseous fission products for connection to an exhaust manifold (not shown), but may also be closed at the ends such that fission products are collected and retained therein.

Figure 4:
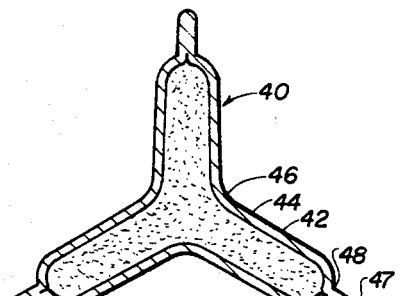
FIGURES 4 and 5 are cross sectional views similar to FIGURE 1 illustrating other embodiments the elements may assume.

Another embodiment 40 shown in FIGURE 4 is constructed with a modified cladding configuration providing increased thermal integrity. The cladding 44 of each fin 42, therein, is formed with a narrow, rib like longitudinal male protuberance 47 integral with said cladding and located at the peripheral edge surface 48 of each of said fins. On assembly, the protuberance 47 mates with a corresponding female seat region 46 located between the intersecting surfaces of the fins of an adjacent element on assembly to provide a core. The protuberance 47 may be a double thickness of said cladding or may be a single unit integrally formed or joined with said cladding.

Figure 5:
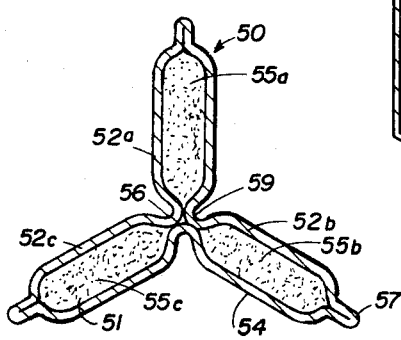

An element embodiment 50, shown in FIGURE 5, has a further modification wherein the fins 52a, 52b, 52c of neutron reactive material 51 are separately fabricated of generally rectangularly sectioned bodies 55a, 55b, 55c disposed in cladding 54. The common axial region is defined by the convergence 59 of the innermost regions of cladding 54 of each of the fins, which fins have a longitudinal male protuberance 57 thereon, somewhat as in the embodiment of FIGURE 4. In this embodiment the seat region is rounded and contoured so as to form a receptacle seat portion 56. Said receptacle may be considered a longitudinal groove which is proportioned to receive a male protuberance of a corresponding fin of an adjacent element when assembled in a reactor core, and thus form an interlocking configuration providing increased structural strength as set forth hereinafter. More positive seating and positioning is obtained with the foregoing arrangement. Other similar interlocking mating configurations will occur to those skilled in the art.

Figure 6:
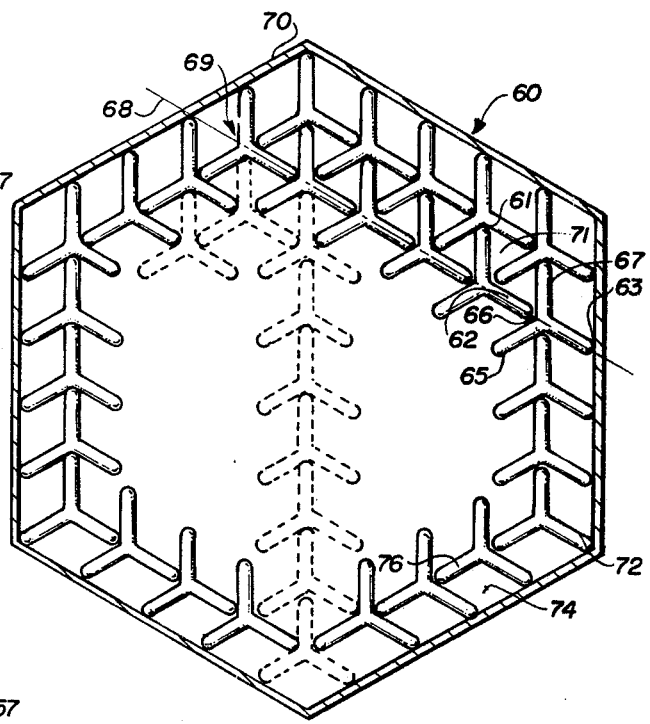
FIGURE 6 is a cross sectional view illustrating an embodiment of an assembly of neutron reactive material elements to form a nuclear reactor core.

The foregoing elements may be arranged as illustrated in FIGURE 6 wherein is shown a reactor core assembly 60 comprising a plurality of co-extensive neutron reactive material elements 61. For simplicity, elements 61 are shown with the external configuration of the embodiments of FIGURES 1, 2 and 3. The external configuration of the core shown in FIGURE 6, is a hexagonal cylinder described by a wrapper or shroud vessel 70. It is, however, an advantage of this invention that other assembly and sub-assembly trifid configurations may be fabricated so as to provide any polygonal cylindrical core shape. The elements 61 are so assembled that each fin 62 not situated at the periphery of the core mates with a corresponding female seat region 66 of an adjacent element 63 such that the oblique angle formed by adjacent fins 65 and 67 of the same element 63 is bisected, thereby creating an interlocking array of parallel rows of neutron reactive elements which are mutually supporting and substantially self-aligning. Moreover, it will be noted that fins of adjacent elements are aligned with the median planes thereof parallel to the sides of said core and in addition other fins of said elements being aligned with the bisectors of the polygonal configuration. For simplicity, the lower ends of said elements may rest on a lower planar perforated support sheet (not shown) in a reactor core vessel. Thus the median plane 68 of each fin so mating in a given row 69 of elements is aligned with the median plane of each of the other mating fins in the said row. The adjacent mating fins define generally equilateral triangular cross section channels 71 for the passage of coolant therethrough. The fins 72 of element at the periphery of the core touch the wrapper can 70 so as to form rhombodial cross section coolant channels 74 defined by said external fins 72 and fins 76 arranged with median planes aligned in the first row inside the periphery of the assembly.

In providing the foregoing configuration it will be apparent that the length of the fin portions projecting from the axial region of said elements must be several times greater than the transverse width of the fins to provide appropriate cross sectional area in said coolant channels, to provide coolant throughout, proportioned correlative to the heat output of the fuel element. The heat transfer surface area of said coolant channels is thereby enlarged as compared to circular channels and the relatively narrow fin thickness also improves heat transfer.

Although the foregoing embodiments have been described in detail, there are obviously many other embodiments and variations in configurations which may be made by a person skilled in the art without departing from the spirit, scope or principle of this invention. Therefore, this invention is not to be limited except in accordance with the scope of the appended claims.

I claim:

1. In a core assembly for nuclear reactors, the combination comprising a plurality of co-extensive rigid pin-type elements of neutron reactive material positioned in parallel ordered array in said core, each of said elements defining three elongated fins of integrally clad neutron reactive material of generally rectangular cross section radially projecting from a common axial region, with adjacent fins of each of said elements defining female seat regions between said fins proximate said common axial region, said elements positioned with each peripheral fin edge disposed in mating relationship with said female seat regions of an adjacent element, thereby spacing and positioning said elements in fixed relation, and with the fins of adjacent elements describing generally triangular cross section channels therebetween for the passage of coolant therethrough.

2. A neutron reactive material element for fabricating a nuclear reactor core comprising a neutron reactive material disposed in three elongated generally rectangular transverse cross section bodies radially projecting from a common axial region in a trifid pattern, continuous cladding integral with and covering the outer surface of said neutron reactive material, the surface of said cladding in the region between each of said fins proximate said common axial region defining a female seat region for receiving in mating relation a corresponding peripheral edge surface of a fin of a similar element in an assembly to provide said nuclear reactor core.

3. A neutron reactive material element as defined in claim 2 wherein elongated co-extensive cylindrical structural member of a diameter not greater than the transverse cross sectional width of one of said fins is disposed in said common axial region of said element.

4. A neutron reactive material element as defined in claim 3 wherein said structural member comprises a tube having openings between said neutron reactive material and the inside of said tube for the passage of fission product gases therethrough.

5. A neutron reactive material element as defined in claim 2 wherein a semi-cylindrical tip is provided at said peripheral edge surface of said fins.

6. A neutron reactive material element as defined in claim 2 wherein a male longitudinal rib protuberance is provided to extend outwardly from said peripheral edge surface of said fins along the median plane thereof.

7. A neutron reactive material element as defined in claim 2 wherein said peripheral edge surface of said fin further comprises a male longitudinal rib protuberance located thereon and said common axial region further comprises a seat region defined by the convergence of said cladding of said fins, said seat region disposed between sequential fins to receive a corresponding male protuberance of a fin of an adjacent similar element in a reactor core assembly.

References Cited
UNITED STATES PATENTS

| | | | |
|---|---|---|---|
| 3,151,034 | 9/1964 | Douglass et al. | 176—86 |
| 3,261,758 | 7/1966 | Maldague et al. | 176—90 |

FOREIGN PATENTS

| | | |
|---|---|---|
| 980,298 | 1/1965 | Great Britain. |

L. DEWAYNE RUTLEDGE, *Primary Examiner.*